INVENTOR
F. MARTINDELL
BY [signature]
ATTORNEY

Dec. 10, 1946. F. MARTINDELL 2,412,278
ARTICLE FEEDING APPARATUS
Filed July 23, 1943 3 Sheets-Sheet 2

INVENTOR
F. MARTINDELL
BY Harry L. Swift
ATTORNEY

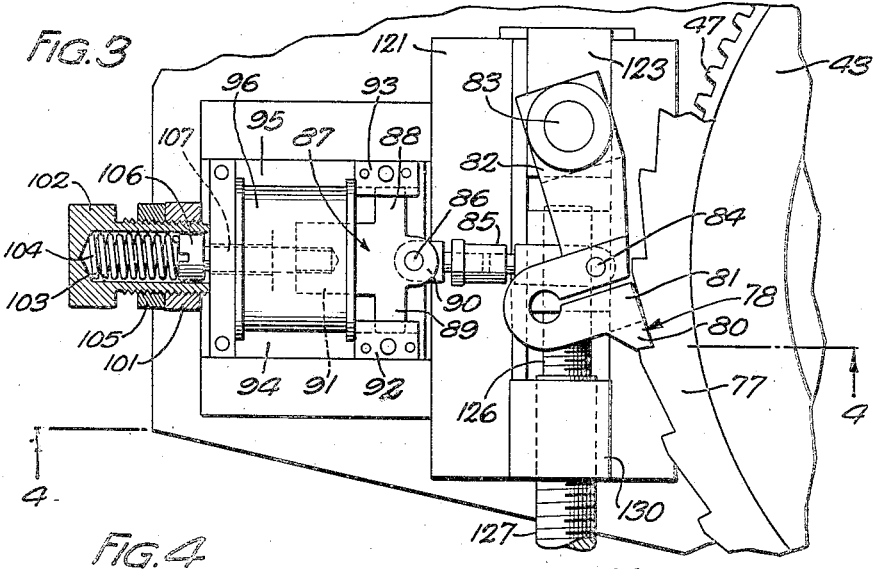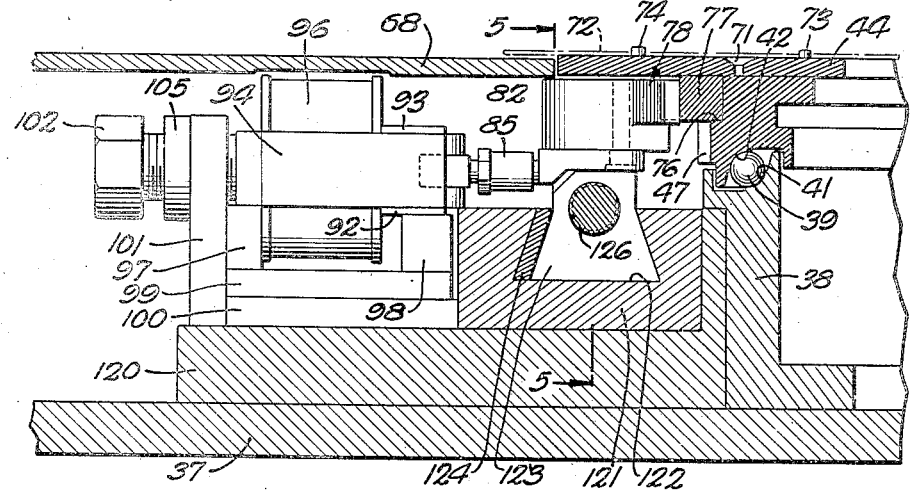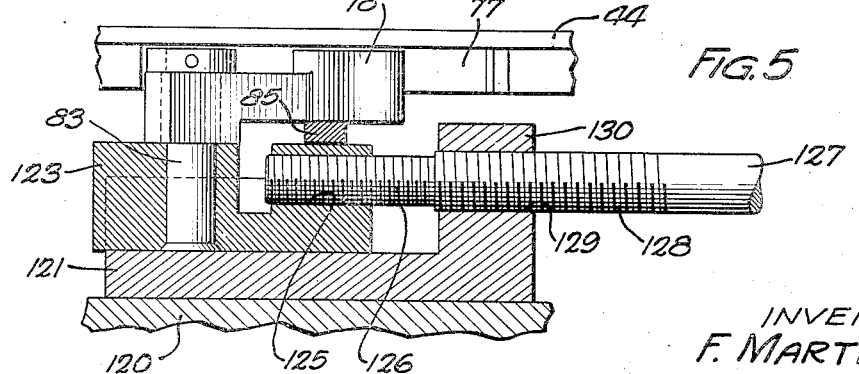

Patented Dec. 10, 1946

2,412,278

UNITED STATES PATENT OFFICE 2,412,278

ARTICLE FEEDING APPARATUS

Frank Martindell, Western Springs, Ill., assignor to Western Electric Company, Incorporated, New York, N. Y., a corporation of New York Application July 23, 1943, Serial No. 495,909

7 Claims. (Cl. 219—4)

This invention relates to article feeding apparatus and more particularly to an apparatus for feeding parts to a welding machine.

It is an object of the present invention to provide a simple and highly accurate feeding mechanism for feeding parts to a processing machine.

In accordance with one embodiment of the invention, an apparatus is provided for feeding contact springs between a pair of welding electrodes where short lengths of contact material may be welded to the springs. The apparatus for moving the parts to position to have the contacts welded on them comprises an indexable table under constant torsion from a torque motor drive and released to step a new contact spring to position between the welding electrodes each time a welding operation is completed. The table has a pair of micrometrically adjustable pawl mechanisms associated with it and normally urged to engage teeth formed on the table to block motion of the table, but operable under solenoid control in timed relation to the operation of the welding machine whereby when one pawl is in engagement with a ratchet tooth on the table, the other pawl is released therefrom. The micrometric adjustment of the pawls permits a very fine adjustment over a relatively wide range of the positions to which the table will be indexed.

A clear understanding of the invention may be had by reference to the following detailed description when considered in conjunction with the accompanying drawings, wherein Fig. 1 is a plan view of an indexable contact spring-carrying table and its associated parts which effect its indexing operation;

Fig. 2 is a transverse vertical sectional view taken substantially along the line 2—2 of Fig. 1 in the direction of the arrows showing some details of the welding mechanism so far as they pertain to the present invention and showing the details of construction of the drive mechanism for the indexable table, together with a superposed circuit schematic of the various control connections for the apparatus;

Fig. 3 is an enlarged detail plan section of a portion of the apparatus showing the solenoid actuated pawl and a small section of the ratchet portion of the indexable table;

Fig. 4 is an irregular vertical sectional view taken substantially along the line 4—4 of Fig. 3 in the direction of the arrows showing further details of the pawl mechanism; and Fig. 5 is a transverse vertical sectional view taken substantially along the line 5—5 of Fig. 4 in the direction of the arrows showing the details of the adjusting mechanism for the pawls.

Figure 2:
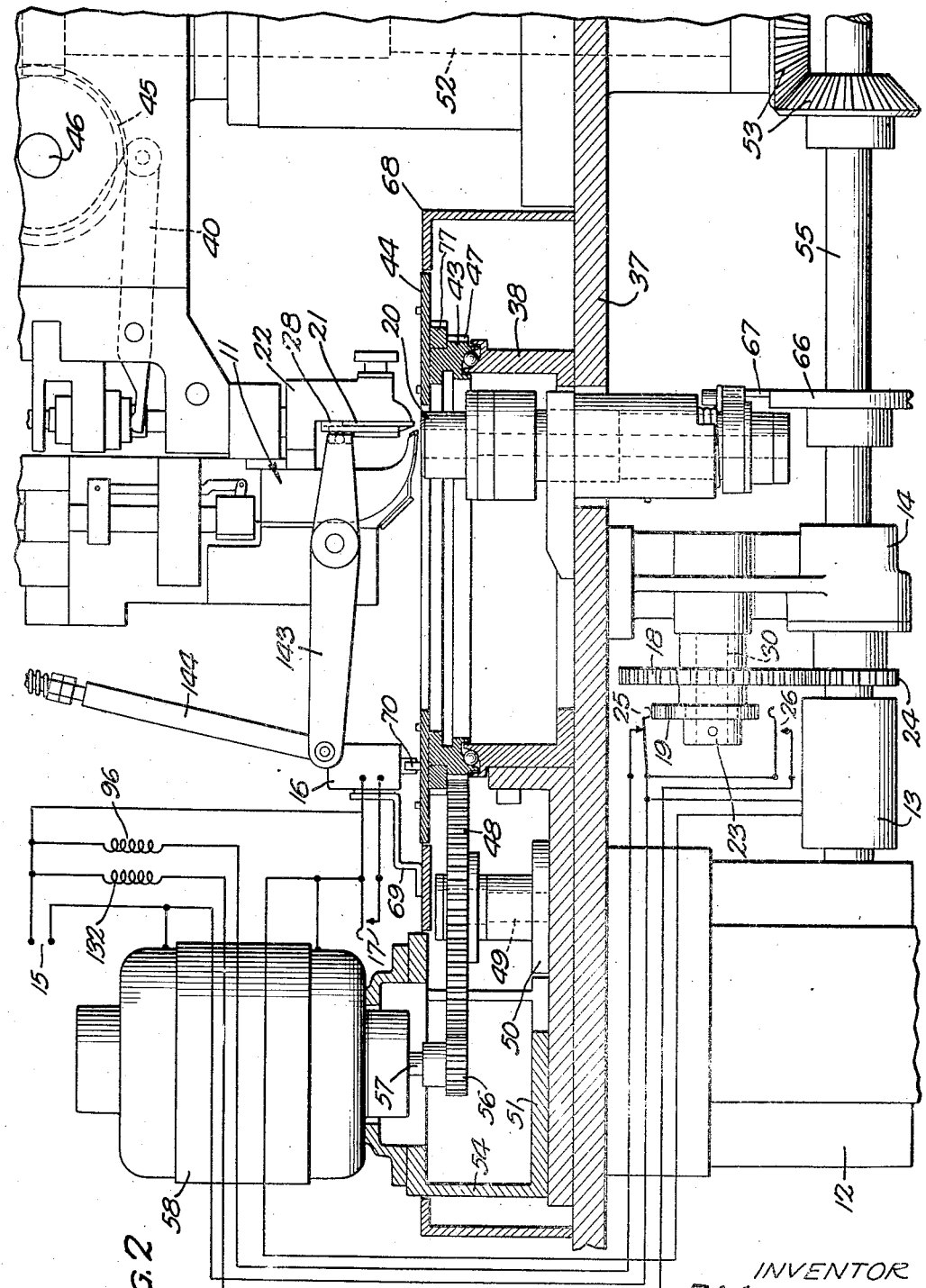

Referring to the drawings, wherein like reference characters designate the same parts throughout the several views, particular reference first being had to Fig. 2, there is shown a portion of a welding apparatus of the type shown in detail in the co-pending application of Frank Martindell, Serial No. 450,409, filed July 10, 1942, now Patent No. 2,388,754, dated Nov. 13, 1945. As described in detail in the aforementioned co-pending application, the contact welding apparatus includes a main base plate 37 having a vertical shaft 52 extending through it for driving the contact strip feeding mechanism, designated generally by the numeral 11, and the circular upper welding electrode 21 through the operation of a cam shaft 46, which is adapted to be driven by the vertical shaft 52 and carries suitable cams 45, one of which drives a lever 40 which is adapted to actuate an upper electrode supporting head 22. Other cams on the shaft 46, through the instrumentality of a link 144 and lever 143, reciprocate a cutter 28. The upper welding electrode 21 is associated with a cylindrical lower welding electrode 20 and for each cycle of operation of the welding apparatus, a contact will be welded onto a contact spring. In the apparatus disclosed in the aforesaid co-pending application, means is provided for rotating the circular upper welding electrode 21 and the cylindrical lower welding electrode 20 to present new areas of the electrodes in juxtaposed positions for each new welding operation. These mechanisms include a driving disc 66 and a driving finger 67 adapted to actuate the lower electrode. The driving disc 66 is mounted upon a main drive shaft 55, which is connected by suitable gearing 53 to vertical shaft 52. The main drive shaft 55 is adapted to be driven by a motor 12 secured to the underside of the base plate 37 and connectible to the main drive shaft 55 through a solenoid actuated clutch 13 of any suitable type. The shaft 55 is supported in a bearing 14 fixed to the underside of the base plate 37. In a preferred form of the invention, power for operating the solenoid actuated clutch is supplied from a current source 15, through a switch 16, which is closed in a manner to be described hereinafter, and through a manually operable switch 17 in series.

Mounted on the bearing bracket 14 is a stud shaft 30 having freely rotatable thereon a driven gear 18, which has suitably secured to it a switch cam 19, the gear 18 and switch cam 19 being rotatable together and being held on the stud shaft 30 by a collar 23. The gear 18 is adapted to be driven by a driving gear 24 mounted upon the main drive shaft 55 and when the gear 24, which is one-half the size of the gear 18, drives the gear 18 and switch cam 19, the switch cam will, at a predetermined time in the cycle of rotation of the gear 18, alternately close the switches 25 and 26 for a purpose to be explained hereinafter. This arrangement of the gears 24 and 18 and the associated switch cam 19 is such that on alternate cycles of rotation of the shaft 55, the switch 25 will be closed and on the intermediate cycles the switch 26 will be closed.

The main base plate 37 has mounted thereon a bearing ring 38, which encircles the lower welding electrode 20 and is mounted eccentrically of said electrode 20. This bearing ring is shaped, as shown most clearly in Fig. 4, to receive a series of ball bearings 39 between a curved surface 41 on the ring 38 and a cooperating curved surface 42 formed on an upper annular bearing member 43, which, in turn, supports an annular indexable table 44. The upper bearing member 43 has a ring gear 47 formed thereon and meshing with an idler gear 48, which is freely rotatable on the upper end of a stud shaft 49 set into a bearing 50. The bearing 50 is mounted on a bracket 51, on which there is also mounted a gear housing 54. The gear housing 54 encloses a part of the gear 48 and a driving gear 56 mounted on the end of the drive shaft 57 of an induction type torque motor 58. The motor 58 is connected in parallel with the solenoid actuated clutch 13 so that whenever power is supplied to the solenoid actuated clutch for connecting the motor 12 to the main drive shaft 55, power will also be supplied to the motor 58, tending to operate the motor 58. An induction type torque motor is chosen for this operation since the motor will tend to run continuously, but will be stalled most of the time, and this particular type of motor does not overheat an appreciable amount and, therefore, will not be damaged when used in this manner.

The annular indexable table 40 is surrounded by a housing 68, which is broken away at the point of entrance to the housing of the gear train including the gear 48. Approximately in alignment with the stud shaft 49, there is a bracket 69 fixed to the upper surface of the housing 68 for supporting the switch 16. This switch is one of the type known as "microswitches" having a roller 70 which is normally held in its downward position to hold the elements of switch 16 open. The bracket 69 is so shaped that the roller 70 of switch 16 will be in alignment with a series of holes 71 formed in the indexable table 40 in position to be covered by contact springs 72 properly positioned on the table in position to have contacts welded on them. From the foregoing, it is believed to be apparent that the roller 70 will move into one of the holes 71 if the hole is not covered by a contact spring 72 and, accordingly, will break the circuit to both the torque motor 58 and the solenoid actuated clutch 15 in spite of the fact that the manually operable switch 17 may be closed at that time. The upper surface of the table is provided with a series of pins 73—73 for engaging the side edges of the contact springs 72 and is also provided with pins 74—74 adapted to enter suitable apertures formed in the contact springs, thus to position the contact springs in proper position to have contacts welded on them.

Figure 1:
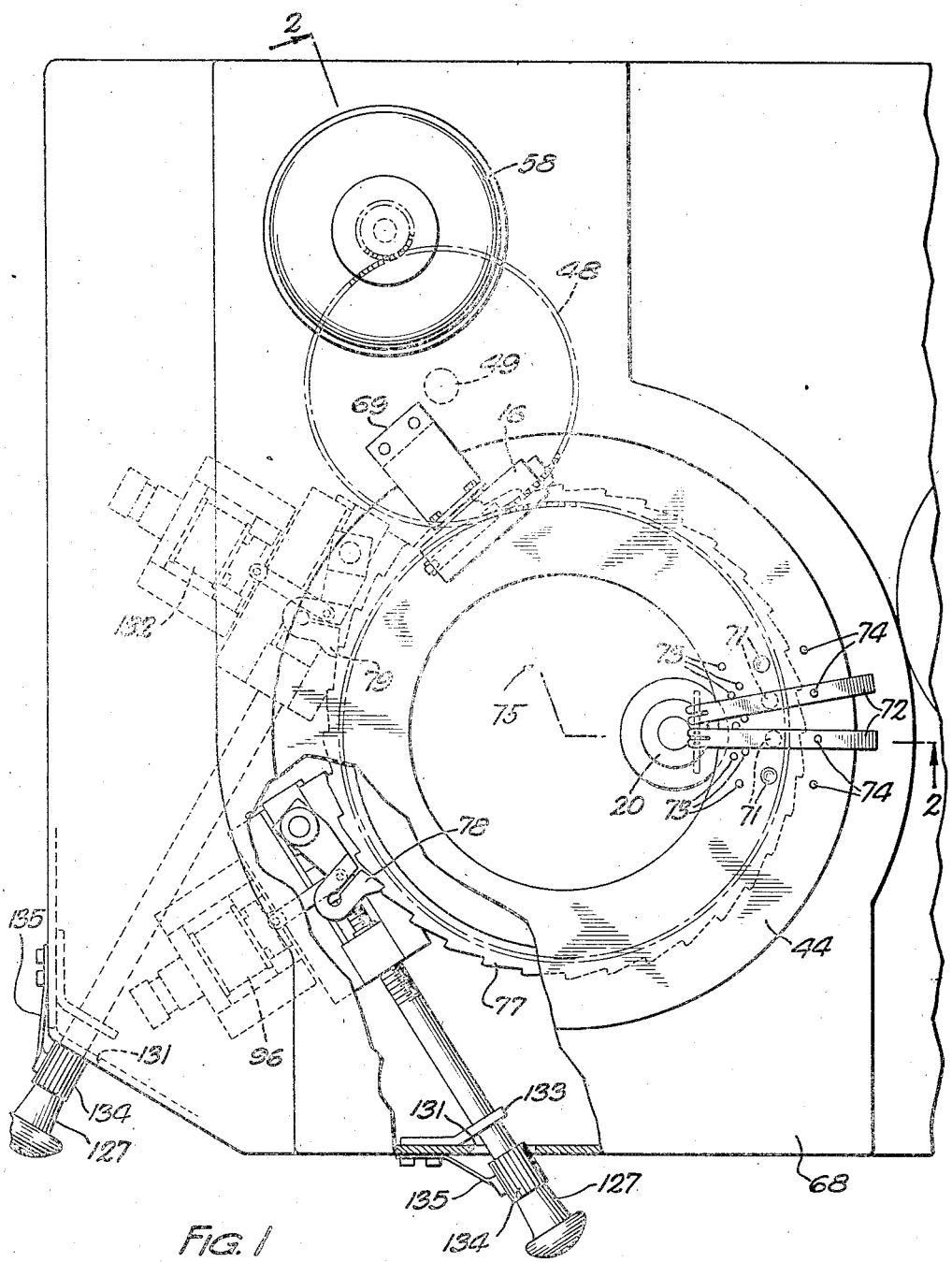

Since the torque motor 58 will, whenever the switches 16 and 17 are closed, supply power tending to drive the gear 56 and, consequently, to impart rotation to the table 44, the table will always tend to rotate in the direction shown by the arrow 75 in Fig. 1. Interposed between the lower surface of the table 44 and a shoulder 76 (Fig. 4) on the bearing member 43 is a ratchet ring 77, which is fixed to the table 44 and the bearing member 43. A pair of pawls 78 and 79 are normally urged to engage the teeth of the ratchet ring and thus block movement of the table 44. The pawls 78 and 79 and their associated actuating mechanisms are of exactly the same construction and, accordingly, only the pawl 78 will be described in detail. This mechanism is shown most clearly in Figs. 3, 4 and 5, to which reference will now be had.

The pawl 78, as seen most clearly in Fig. 3, is provided with a tooth engaging portion 80 extending from a relatively resilient portion 81, which is of substantially U-shaped configuration, permitting some flexing thereof to take up the shock of a tooth on the ratchet ring 77 engaging the tooth engaging portion of the pawl. The resilient portion 81 of the pawl is formed integrally with an arm 82, which is, in turn, oscillatable about a pivot pin 83. The pawl 78 has a pivot pin 84 mounted in it on which there is pivotally mounted one end of an adjustable link 85, the other end of which is pivotally attached by means of a pin 86 to a cross-shaped core member, designated generally by the numeral 87. The core member 87 is provided with arms 88, 89, 90 and 91, the arms 88 and 89 constituting guide portions positioned between guide plates 92 and 93 attached to the upper and lower surfaces of guide blocks 94 and 95. The pin 86 is set into the arm 90 and the arm 91 is normally positioned a short distance within a coil 96, which nests between the guide blocks 94 and 95 and rests upon support blocks 97 and 98 (Fig. 4), which are, in turn, mounted on the spacer block 99. Positioned directly beneath the spacer block 99 is a mounting plate 100, to the left end of which (Fig. 4) a post 101 is attached for threadedly receiving a cylindrical adjusting member 102. The cylindrical adjusting member 102 has a central recess 103 in which a compression spring 104 is seated and the adjusting member 102 may be locked in place by a lock nut 105 after being adjusted relative to the post 101. The head 106 of an actuator screw 107 fits into the recess 103 and is engaged by the spring 104. The shank of the screw 107 is threaded into the arm 91 of the core member 87 and thus the core member 87 will normally be urged to the right (Fig. 3) under the force of the spring 104 and the amount of pressure exerted by the spring 104 on the actuator screw 107 may be adjusted by adjusting the position of the adjusting member 102 with respect to the post 101. The pawl 78 and its interlinked actuating mechanism, together with the coil 96, comprise a unitary structure mounted on a unit base 120, to which the mounting plate 100 may be attached in any suitable manner and which supports a way block 121 having a dove-tail slot 122 formed in it for receiving a dove-tail slide 123. The dove-tail slide 123 may be locked in the slot 122 by means of a locking plate 124 inserted in the dove-tail slot after the slide 123 has been positioned therein. As is shown most clearly in Fig. 5, the dove-tail slide 123 has the pivot pin 83 mounted in it and thus the slide 123 supports the pawl 78. The position of the pawl 78 with respect to the unit base 120 may be adjusted by shifting the slide 123 to the right or left (Fig. 5) and, accordingly, the position of the annular indexable table 24 may be controlled with a high degree of accuracy due to the construction now to be described.

The slide 123 is provided with a threaded aperture 125 adapted to receive a threaded portion 126 of an adjustment screw 127. A second threaded portion 128 of the adjustment screw 127 is threaded into a threaded aperture 129 formed in an upwardly extending portion 130 of the way block 121. The threaded portion 128 of the adjustment screw 127 has a relatively coarse thread cut into it and the threaded portion 126 has a relatively fine thread cut in it, both of the threads having their leads in the same direction whereby, when the adjustment screw 127 is rotated, the screw will move bodily with respect to the way block 121 and will simultaneously move the slide 123 in a direction opposite to the direction of bodily movement of the screw 127. Thus exceedingly fine adjustments may be made in the position of the dove-tail slide 123, and, accordingly, the position of the pawl 78 with respect to the ratchet ring 77 may be adjusted. The unit base 120 for the pawls 78 and 79 may be fixed to the main base plate 37 in any suitable manner and the housing 68 may be provided with suitable apertures 131, through which the free end of the adjustment screws 127 may extend.

It will be understood that the pawl 79 is provided with a solenoid coil 132 of exactly the same construction as the solenoid coil 96 and that the two pawl actuating mechanisms and adjusting mechanisms are identical in construction. Each of the adjustment screws 127 extends through a bearing 133 individual to it and is provided with a knurled portion 134 adapted to be engaged by a retainer spring 135, whereby when the adjustment screw is set to one of its adjusted positions, the spring 135 bearing against the knurled portion 134 will prevent accidental rotation of the adjustment screw 127.

By means of the adjustment screws 127, the position of the pawls 78 and 79 may be adjusted over a relatively wide range, whereby the indexable table 44 may be stopped in approximately any desired position so that contact springs 72 carried thereby may have contacts welded to them in any desired location on the spring.

By reference to Fig. 2, it will be seen that the solenoid coils 96 and 132 will have current supplied to them from the source 15 under control of the switches 25 and 26, whereby the solenoid coils 96 and 132 will be automatically energized due to the construction of the switch cam 19, which controls the switches 25 and 26.

A complete understanding of the invention may be had by reference to the following brief description of the mode of operation of the apparatus. After a supply of contact springs 72 have been placed between the pins 73 and with the pins 74 entering the apertures in the spring 72, manually operable switch 17 may be closed and since the bracket 69 supporting the switch 16 is so positioned that the roller 70 will be engaging an imperforate portion of the top of the table 44 when the machine is at rest, power will be supplied from the source 15 through switches 16 and 17 to the solenoid actuated clutch 13 and will initiate a cycle of operation of the shaft 55, it being assumed that a suitable source of power has been connected to the motor 12 to energize it. Since the switch 25 is closed as shown in Fig. 2 at this time, solenoid coil 96 will be energized and pawl 78 will be withdrawn from engagement with the face of the ratchet ring 77, thus permitting the ratchet ring to rotate until the pawl 79 engages one of the teeth on the ratchet wheel. If a complete supply of contact springs 72 has been properly positioned on the table 44, the circuit to the clutch 13 will not be interrupted at the switch 16 and the clutch 13 will, therefore, remain operative and shaft 55 will continue to rotate. As the shaft 55 continues to rotate, the welding portion of the apparatus will operate, as described in detail in the hereinbefore identified co-pending application, and each time the shaft 55 completes one revolution, a contact will be sheared off and welded to a contact spring 72. Due to the gear ratio between the gears 18 and 24, the cam switch 19 will operate one or the other of the switches 25 and 26 for each cycle of the shaft 55 and these switches will be operated alternately. Therefore, as soon as the shaft 55 completes one revolution, switch 25 will be opened to de-energize solenoid coil 96 and permit the pawl 78 to engage the sloping surface of one of the teeth on the ratchet ring 77. Switch 26 will, at this time, be closed to supply current to the solenoid coil 132. Solenoid coil 132, being energized, will remove the pawl 79 from engagement with the ratchet ring 77, permitting the ratchet ring 77 and table 44 secured thereto to move until the pawl 78 blocks further movement thereof. It will be understood that as soon as the switches 16 and 17 are closed, power will be supplied to the induction type torque motor 58 simultaneously with the energization of the solenoid operated clutch 13 and that the torque motor will continue to exert a driving force through gears 56 and 48 to the ring gear 47 and thus all the time that the clutch 13 is energized, the motor 38 will tend to drive the table 44. However, the table 44 will only move when one of the pawls 78 or 79 is removed from blocking association with the ratchet ring 77. Operation of the motor 58 and clutch 13 will be interrupted any time a portion of the table 44, which should have had a contact spring 72 positioned on it arrives under the roller 70 without a contact spring in place on the table due to the roller 70 entering one of the holes 71.

What is claimed is:

1. A feeding apparatus for a processing machine having a driving motor and an indexable table comprising a torque motor drive for said table, escapement mechanism for rendering said torque motor drive ineffective, and means driven by the processing machine motor for controlling said escapement mechanism, said escapement mechanism including a pair of alternately energizable solenoid operated pawls operable in timed relation to the processing machine.

2. In a feeding mechanism for a processing machine having a driving motor and including an indexable table, a torque motor tending to drive said table, a ratchet on said table, solenoid operated pawls normally urged to engage said ratchet, and means driven by the driving motor of the processing machine for alternately energizing the solenoids of the solenoid actuated pawls to disengage the pawls from the ratchet.

3. In a feeding mechanism for a processing machine, the combination with means for driving the processing machine of an indexable table, a torque motor tending to drive said table, a ratchet on said table, solenoid operated pawls normally urged to engage said ratchet, means operable by the driving means for the processing machine for alternately energizing the solenoids of the solenoid actuated pawls to disengage the pawls from the ratchet, and means for adjusting the effective position of said pawls with respect to the ratchet.

4. In a feeding mechanism for a processing machine, the combination of a motor drive for the processing machine with an indexable table, a torque motor tending to drive said table, a ratchet on said table, solenoid operated pawls normally urged to engage said ratchet, means operable by the driving motor for the processing machine for alternately energizing the solenoids of the solenoid actuated pawls to disengage the pawls from the ratchet, and means for individually adjusting the effective position of such pawls with respect to the ratchet for adjusting the stopping positions of the indexable table.

5. In a feeding mechanism for a processing machine, the combination of a drive motor for the processing machine with an indexable table, a torque motor tending to drive said table, a ratchet on said table, solenoid operated pawls normally urged to engage said ratchet, means operable by the driving motor for the processing machine for alternately energizing the solenoids of the solenoid actuated pawls to disengage the pawls from the ratchet, and means for individually adjusting the effective position of such pawls with respect to the ratchet for adjusting the stopping positions of the indexable table, said last mentioned means including an adjustment screw having threaded portions of different pitch.

6. In a feeding mechanism, a base member, a ratchet normally urged to rotate on the base, a pawl support adjustable with respect to the base, and means for adjusting the pawl support including a bracket fixed to the base and a threaded member threadedly engaging the pawl support and base, said threaded member having portions threaded differently to separately engage the pawl support and base.

7. In a feeding mechanism, a base member, a ratchet normally urged to rotate on the base, a pawl support adjustable with respect to the base, and means for adjusting the pawl support including a bracket fixed to the base and a threaded member threadedly engaging the pawl support and base, said threaded member having relatively coarse and fine pitched threads formed on it and having its coarse and fine threads threadedly engaging the base and pawl support, respectively.

FRANK MARTINDELL.